(12) United States Patent
Sugiyama

(10) Patent No.: US 9,403,421 B2
(45) Date of Patent: Aug. 2, 2016

(54) VEHICLE DOOR

(71) Applicant: HONDA MOTOR CO., LTD, Tokyo (JP)

(72) Inventor: Hiroto Sugiyama, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 14/658,780

(22) Filed: Mar. 16, 2015

(65) Prior Publication Data

US 2015/0258878 A1 Sep. 17, 2015

(30) Foreign Application Priority Data

Mar. 17, 2014 (JP) .................. 2014-053267

(51) Int. Cl.
*B60J 5/04* (2006.01)

(52) U.S. Cl.
CPC ............... *B60J 5/0448* (2013.01); *B60J 5/043* (2013.01); *B60J 5/0423* (2013.01); *B60J 5/0429* (2013.01)

(58) Field of Classification Search
CPC ............ B60J 5/04; B60J 5/0412; B60J 5/042; B60J 5/0422; B60J 5/0423; B60J 5/0425; B60J 5/0427; B60J 5/0429; B60J 5/043; B60J 5/0438; B60J 5/0441; B60J 5/0443; B60J 5/0444; B60J 5/0448; B60J 5/0456; B60J 5/0458; B60J 5/0461
USPC ................................ 296/146.5, 146.6, 187.12
See application file for complete search history.

(56) References Cited

U.S. PATENT DOCUMENTS

| | | | | |
|---|---|---|---|---|
| 7,837,255 B1* | 11/2010 | Okutsu | ................. | B60J 5/0425 280/735 |
| 8,398,149 B2* | 3/2013 | Weiter | ................. | B60J 5/0412 296/146.6 |
| 2006/0290166 A1* | 12/2006 | Gehringhoff | .......... | B60J 5/0429 296/146.6 |
| 2007/0102955 A1* | 5/2007 | Bodin | .................... | B60J 5/0425 296/146.6 |
| 2009/0146451 A1* | 6/2009 | Broadhead | ............. | B60J 5/0416 296/146.6 |
| 2011/0221229 A1* | 9/2011 | Rouhana | .................. | B60J 5/042 296/146.6 |
| 2011/0254311 A1* | 10/2011 | Dajek | ................. | B29C 45/1671 296/146.6 |
| 2013/0168997 A1* | 7/2013 | Kurokawa | .............. | B60J 5/0451 296/146.6 |
| 2015/0258878 A1* | 9/2015 | Sugiyama | .............. | B60J 5/0448 49/505 |
| 2015/0352929 A1* | 12/2015 | Brar | ...................... | B60J 5/0431 296/187.12 |

FOREIGN PATENT DOCUMENTS

| | | | | |
|---|---|---|---|---|
| JP | 2006-69397 | * | 3/2006 | ................. B60J 5/04 |
| JP | 2012-111380 A | | 6/2012 | |

* cited by examiner

*Primary Examiner* — Gregory Blankenship
(74) *Attorney, Agent, or Firm* — Westerman, Hattori, Daniels & Adrian, LLP

(57) ABSTRACT

A vehicle door includes a door body, a lower reinforcing member extending in a door width direction at a lower end inside the door body, and a door beam including a beam extension portion extending downwards from a beam body portion extending in the door width direction. The lower reinforcing member includes an upper surface extending in a substantially horizontal direction and an outer side surface extending downwards from the upper surface. The upper surface includes a concave portion and a convex portion. The beam extension portion includes an extension portion body disposed so as to overlap the outer side surface from the vehicle outer side when viewed in a vehicle inside-outside direction, and an inner extension portion that extends towards a vehicle inner side from the extension portion body and that is disposed so as to overlap the convex portion when viewed in the door width direction.

9 Claims, 10 Drawing Sheets

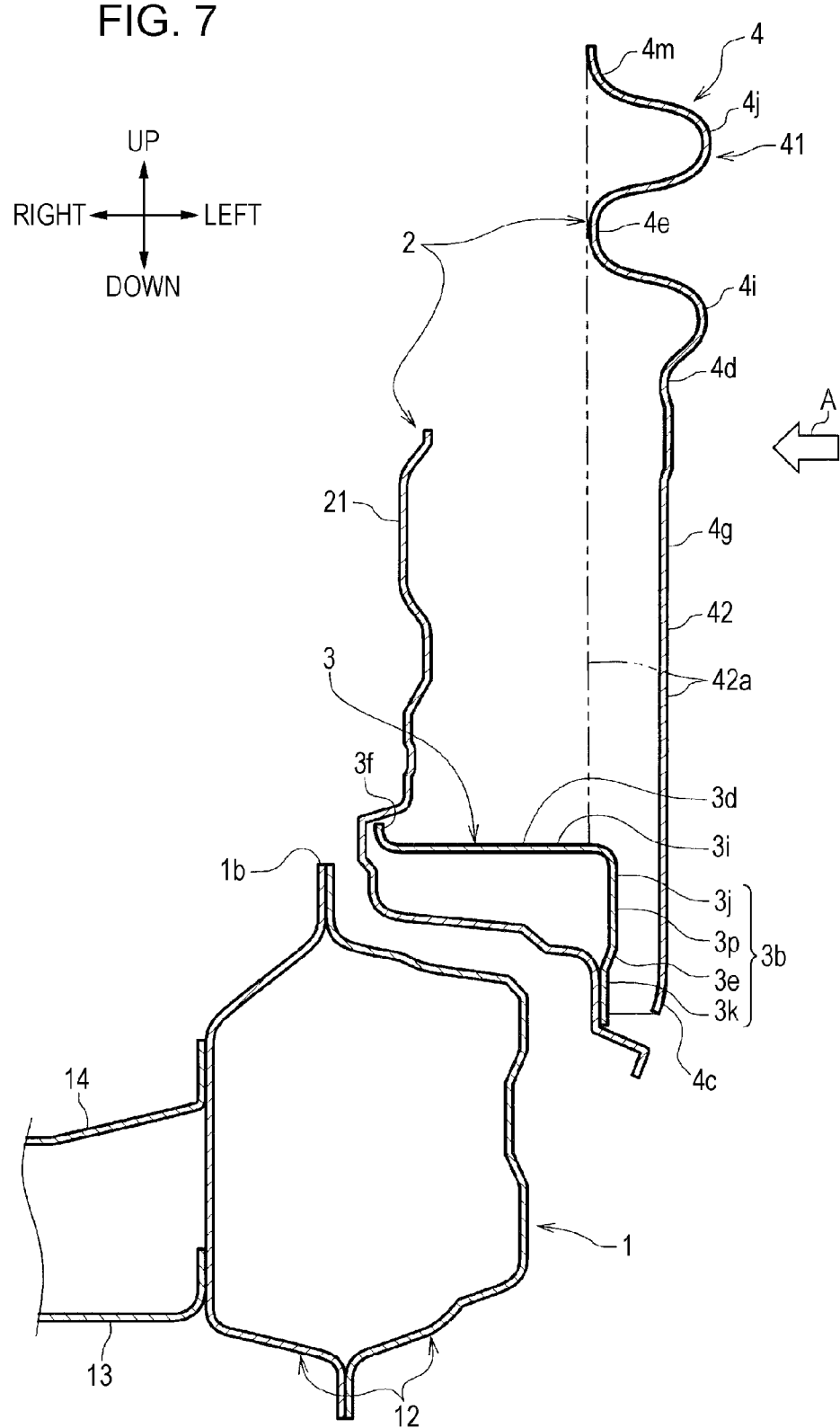

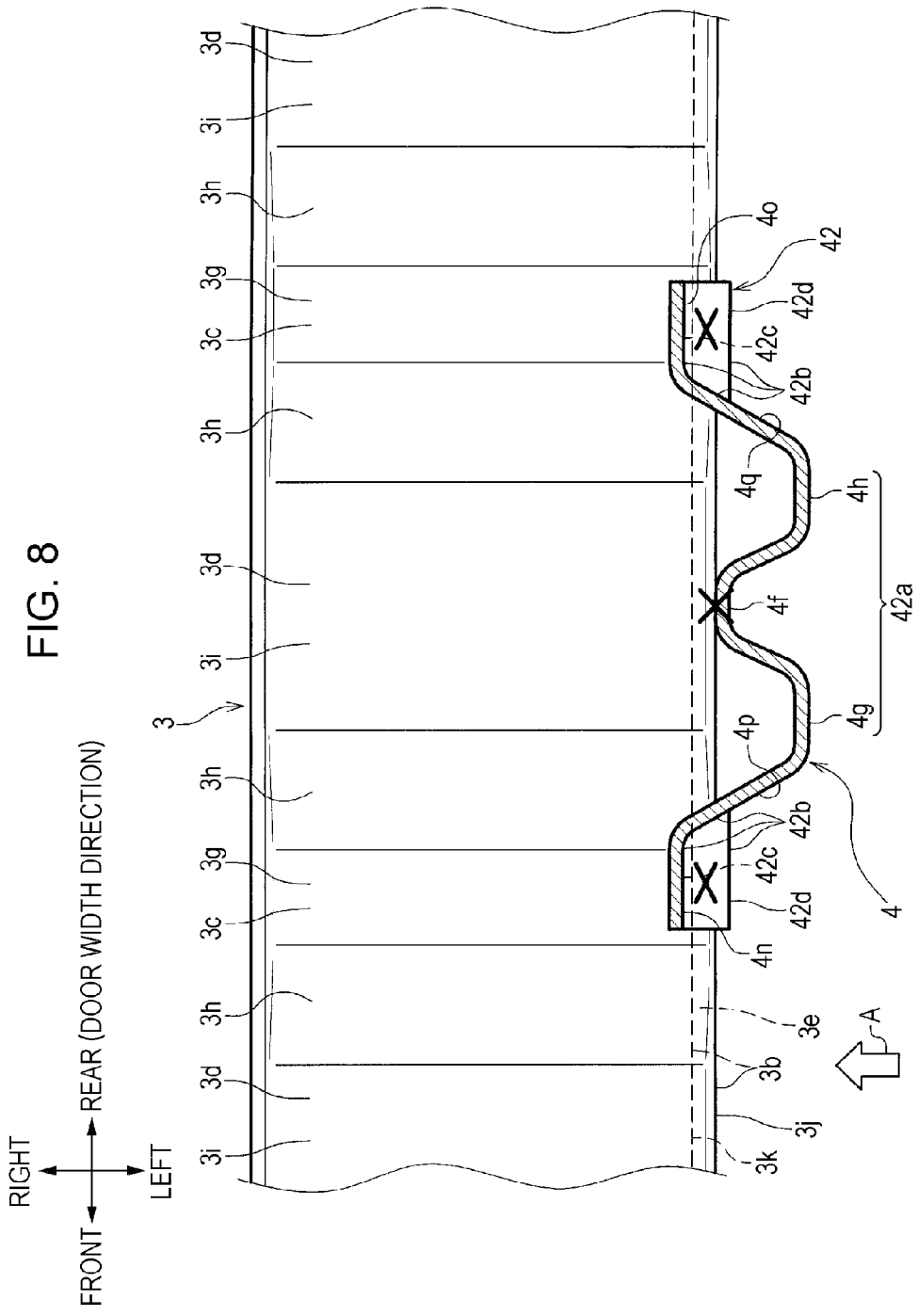

VEHICLE DOOR

CROSS REFERENCES TO RELATED APPLICATIONS

The present application claims priority under 35 U.S.C. §119 to Japanese Patent Application No. 2014-053267, filed Mar. 17, 2014, entitled "VEHICLE DOOR." The contents of this application are incorporated herein by reference in their entirety.

BACKGROUND

1. Field

The present disclosure relates to a vehicle door in which a door beam is installed.

2. Description of the Related Art

A door beam for reinforcement is typically attached inside a vehicle door by welding, such as spot welding, or by mechanical fixing members, such as nuts and bolts. As a vehicle door that is provided with a door beam for suppressing deformation of the door towards a vehicle inner side upon lateral collision (hereinafter, referred to as a "side impact") with another vehicle or the like, a vehicle door (a door structure) disclosed in Japanese Unexamined Patent Application Publication No. 2012-111380, for example, is known.

In the vehicle door described in Japanese Unexamined Patent Application Publication No. 2012-111380, a lower end portion of a beam extension portion extended downwards from a beam body portion extending in a front-rear direction of a door beam is overlapped in a vehicle width direction and is fixed to a lower reinforcing member that is provided at a lower end inside the door body and that extends in the front-rear direction of the vehicle.

However, the vehicle door disclosed in Japanese Unexamined Patent Application Publication No. 2012-111380 merely overlaps and joins the lower end portion of the beam extension portion of the door beam to a portion on the vehicle outer side with respect to a surface of the lower reinforcing member on the vehicle outer side. In the vehicle door with the above structure, the rigidity of a joined portion between the beam extension portion of the door beam and the lower reinforcing member is low and the relative positional relationship between the lower end portion of the beam extension portion and the lower reinforcing member may be disadvantageously changed by crash induced load upon side impact.

SUMMARY

Accordingly, the present application describes a vehicle door that is capable of suppressing displacement of the beam extension portion of the door beam upon side impact by increasing the rigidity of the lower reinforcing member.

In order to overcome the above issue, the vehicle door according to the present disclosure includes a door body, a lower reinforcing member that extends in a door width direction at a lower end inside the door body, and a door beam including a beam body portion that extends in the door width direction at a portion above the lower reinforcing member inside the door body and a beam extension portion that extends downwards from the beam body portion. In the vehicle door, the lower reinforcing member includes an upper surface that extends in the door width direction and an outer side surface that extends downwards from an end portion of the upper surface on a vehicle outer side, the upper surface includes a concave portion (which typically is a portion recessed downwards like a small valley) and a convex portion (which typically is a portion protruding upwards like a small mountain such that the surface of the convex portion extends upwards from one adjacent concave portion and then downwards from its top end to another adjacent concave portion), and the beam extension portion includes an extension portion body that is disposed so as to overlap the outer side surface from the vehicle outer side when viewed in a vehicle inside-outside direction, and an inner extension portion that is extended from the extension portion body towards a vehicle inner side at a portion above the concave portion and that is disposed so as to overlap the convex portion when viewed in the door width direction. In this manner, the inner extension portion engages the concave portion, which is also referred to as an "engagement portion."

Herein, the "door width direction" denotes a horizontal direction in which the door is extended. In the case of a side door, the "door width direction" is the front-rear direction of the vehicle, and in the case of a back door, the "door width direction" is the vehicle width direction, i.e., the horizontal direction extending along the vehicle body when the door is closing the vehicle opening in a typical vehicle, in which its "up-down direction" of the door body is typically a vertical direction orthogonal to the "door width direction." A "vehicle inside-outside direction" is a thickness direction of the door, which typically is orthogonal to its door with direction and up-down direction.

Furthermore, the "upper surface" is a surface on an upper side that extends in the door width direction and the vehicle inside-outside direction (a door thickness direction) and is not limited to a completely horizontal surface and includes the inclined surfaces of the convex portion.

According to such a configuration, in the vehicle door, since the convex portion and the concave portion are provided on the upper surface of the lower reinforcing member, the inner cross-sectional area of the lower reinforcing member can be increased accordingly with the upper protrusion of the convex portion, and the rigidity of the lower reinforcing member can be increased.

Furthermore, since the extension portion body is disposed so as to overlap the outer side surface from the vehicle outer side, upon collision, even when the door beam receives load that displaces the door beam in the door width direction, displacement in the door width direction can be suppressed.

Furthermore, since the inner extension portion (or the engagement portion) of the door beam is extended from the extension portion body towards the vehicle inner side at a portion above the concave portion and is, when viewed in the door width direction, disposed so as to overlap the convex portion, the inner extension portion can be provided in an engaged state with each of the convex portion and the concave portion. Accordingly, upon collision, when the door beam receives load that displaces the door beam in the door width direction, the inner extension portion abuts against the convex portion and, thus, displacement in the door width direction can be suppressed. Furthermore, upon collision, when the door beam receives load that displaces the door beam downwards, the inner extension portion abuts against the concave portion; accordingly, downwards displacement can be suppressed.

Furthermore, the extension portion body is desirably disposed so as to overlap the convex portion.

With such a configuration, since the beam extension portion of the door beam includes the extension portion body that is disposed so as to overlap the convex portion of the lower reinforcing member from the vehicle outer side when viewed in the vehicle inside-outside direction, upon side impact, the side impact load transmitted through the beam body portion and the beam extension portion can be received by the convex portion of the lower reinforcing member that has high rigidity. Accordingly, upon side impact, deformation of the beam extension portion can be suppressed with the lower reinforcing member and the side impact load can be efficiently transmitted to the door and the vehicle body side.

Furthermore, the inner extension portion is desirably provided on both sides of the extension portion body in the door width direction and is desirably disposed on both sides of the convex portion in the door width direction.

With such a configuration, since the inner extension portions of the door beam are disposed on both sides of the convex portion of the lower reinforcing member in the door width direction, the inner extension portions are disposed in an engaged state with both sides of the convex portion in the door width direction; accordingly, upon collision, displacement of the inner extension portions in both directions of the door width direction can be suppressed. Accordingly, the rigidity of the joined portion between the beam extension portion of the door beam and the lower reinforcing member can be increased.

Furthermore, a plurality of the convex portions are desirably arranged in parallel in the door width direction, and the inner extension portion is desirably disposed between adjoining convex portions.

With such a configuration, since the plurality of the convex portions of the lower reinforcing member are arranged in parallel in the door width direction, the rigidity of the upper surface of the lower reinforcing member can be increased further. Furthermore, since the inner extension portions of the door beam are disposed between adjoining concave portions of the lower reinforcing member, the convex portions are positioned on both sides of the inner extension portions in the door width direction; accordingly, displacement of the beam extension portions in the two directions of the door width direction can be suppressed with the convex portions.

Furthermore, the lower reinforcing member desirably includes an underside that extends at a portion below the upper surface from the outer side surface towards the vehicle inner side, and the beam extension portion desirably includes a lower extension portion that is disposed at a portion below the underside so as to overlap the underside when viewed in an up-down direction.

With such a configuration, since the beam extension portion of the door beam includes the lower extension portion that is disposed so as to overlap the underside of the lower reinforcing member when viewed in the up-down direction, the underside and the lower extension portion are disposed so as to be in an engaged state with respect to each other; accordingly, displacement in the upper direction can be suppressed. Furthermore, since the inner extension portions of the door beam are disposed so as to be in an engaged state with the concave portions of the lower reinforcing member, downward displacement of the beam extension portion can be suppressed. Accordingly, the beam extension portion can be attached so that the beam extension portion is not displaced downwards with respect to the lower reinforcing member.

Furthermore, the extension portion body desirably includes a bead portion that continuously extends from the beam body portion, and the bead portion is desirably disposed from the vehicle outer side so as to overlap the convex portion when viewed in the vehicle inside-outside direction.

With such a configuration, since the bead portion of the extension portion body is disposed from the vehicle outer side so as to overlap the convex portion of the lower reinforcing member, the crash induced load that is applied to the beam body portion upon side impact can be efficiently transmitted from the bead portion to the convex portion of the lower reinforcing member that has high rigidity.

Furthermore, the bead portion is desirably continuously formed to a portion below the underside, and the lower extension portion is desirably provided at the same position as the concave portion in the door width direction.

According to such a configuration, since the bead portion that continuously extends from the beam body portion continuously extends to a portion below the underside of the lower extension portion, a large contact area between the bead portion and the convex portion can be obtained. Accordingly, the bead portion can increase the transmission efficiency of the crash induced load upon side impact.

Furthermore, since the lower extension portion of the door beam is provided at the same position as the concave portion in the door width direction, the inner extension portion and the lower extension portion are disposed in an engaged state with respect to each other in the up-down direction at the position of the concave portion when viewed in the door width direction. Accordingly, in the door beam, since the extension portion body including the bead portion can be disposed so as to overlap the entire convex portion when viewed in the vehicle inside-outside direction, transmission efficiency of the crash induced load upon side impact can be increased.

Furthermore, the inner extension portion is desirably welded to the concave portion from the up-down direction.

With such a configuration, since the inner extension portion of the door beam is welded to the concave portion in the up-down direction, the joined surface can be extended in the vehicle inside-outside direction that is the direction in which the door beam is displaced upon side impact, and compared with joining the inner extension portion in the vehicle inside-outside direction, tear of the joined portion between the beam extension portion (the inner extension portion) and the lower reinforcing member can be suppressed.

Furthermore, the lower reinforcing member desirably includes a concave portion-abutting side surface that is formed between the end portion of the concave portion on the vehicle outer side in the vehicle inside-outside direction and an upper end portion of the underside, and the beam extension portion desirably includes a concave-abutting-side engagement portion that engages with the end portion of the concave portion on the vehicle outer side in the vehicle inside-outside direction, the concave portion-abutting side surface, and the underside.

With such a configuration, since the beam extension portion of the door beam includes a concave-abutting-side engagement portion that engages with the end portion of the concave portion on the vehicle outer side in the vehicle inside-outside direction, the concave portion-abutting side surface, and the underside, the concave-abutting-side engagement portion and the lower reinforcing member can be firmly joined together.

BRIEF DESCRIPTION OF THE DRAWINGS

FIG. 7 is an enlarged end view taken along line VII-VII of FIG. 4.

FIG. 8 is an enlarged end view taken along line VIII-VIII of FIG. 4.

FIGS. 9A and 9B are each diagrams illustrating a modification of the beam extension portion of the vehicle door according to the present disclosure, in which FIG. 9A is an enlarged perspective view illustrating an essential portion of the beam extension portion and FIG. 9B is an enlarged cross-sectional view illustrating the beam extension portion.

DESCRIPTION OF THE PREFERRED EMBODIMENTS

Referring to FIGS. 1 to 8, an example of a vehicle door according to an exemplary embodiment of the present disclosure will be described hereinafter.

Note that the description will be given while the forward traveling direction of the vehicle is the "front", the backward traveling direction is the "rear", the vertically upward direction is "up", the vertically downward direction is "down", and the vehicle width direction is the "left" and the "right."

[Vehicle]

Figure 1:
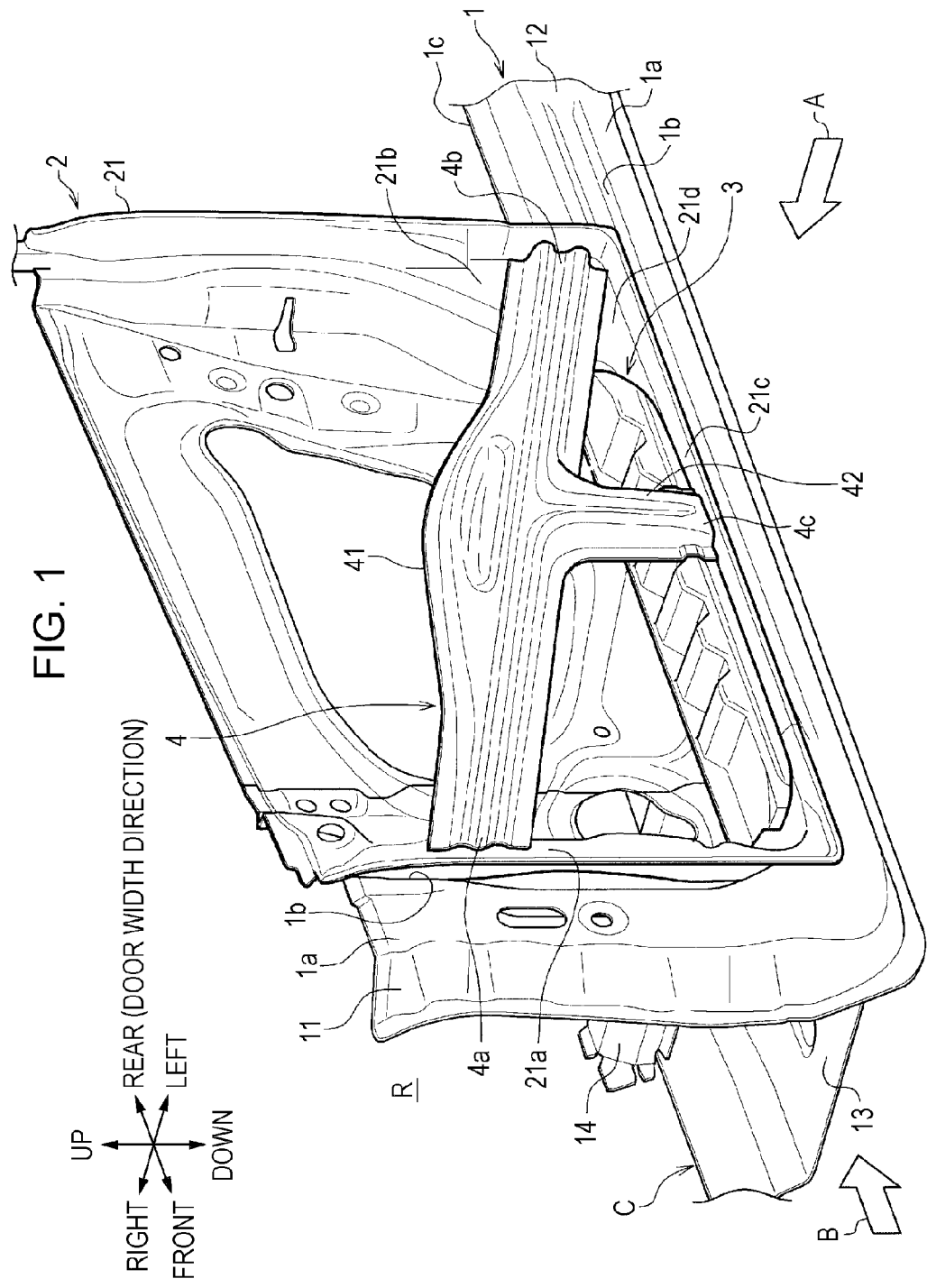
FIG. 1 is a schematic perspective view illustrating an essential portion of a vehicle door according to an exemplary embodiment of the present disclosure.

Prior to describing the vehicle door according to the exemplary embodiment of the present disclosure, description of a vehicle C to which the vehicle door of the present disclosure is applied will be given first. The vehicle C is not limited to any type or form, and, as illustrated in FIG. 1, the vehicle C may be any vehicle that includes a door 2 inside of which a door beam 4 is installed. In other words, it is only sufficient that the vehicle C includes a door 2 in a vehicle body lateral portion 1a (left and right side of the vehicle body in the vehicle width direction and a front and rear side of the vehicle body in the front-rear direction). Hereinafter, the present disclosure will be described by citing an example of a passenger car including front doors (doors 2), which are provided in the vehicle body lateral portion 1a of a vehicle body 1 in the vehicle width direction (the left-right direction), and rear doors (not shown).

[Vehicle Body]

Door openings 1b and 1c for installing the doors 2 in an openable and closable manner in the left and right portions of the vehicle body lateral portion 1a are formed in the vehicle body 1, for example. Since the vehicle body 1 is formed in a laterally symmetrical shape, hereinafter, the left side of the vehicle body lateral portion 1a will be described and description of the right side of the vehicle body lateral portion 1a will be omitted.

As illustrated in FIG. 1, the door opening 1b is formed in the vehicle body lateral portion 1a.

The door opening 1b is formed in a square shape with a side sill 12, a front pillar lower 11 and, although not shown, with a front pillar, a roof side rail, and a center pillar. The door opening 1c, in which the rear door (not shown) is disposed, is formed at a rear side of the door opening 1b with the center pillar (not shown) in between.

As illustrated in FIG. 1, the front pillar lower 11 is a frame member extending upwards from a front end of the side sill 12 and forms a front side frame portion of the door opening 1b.

Figure 6:
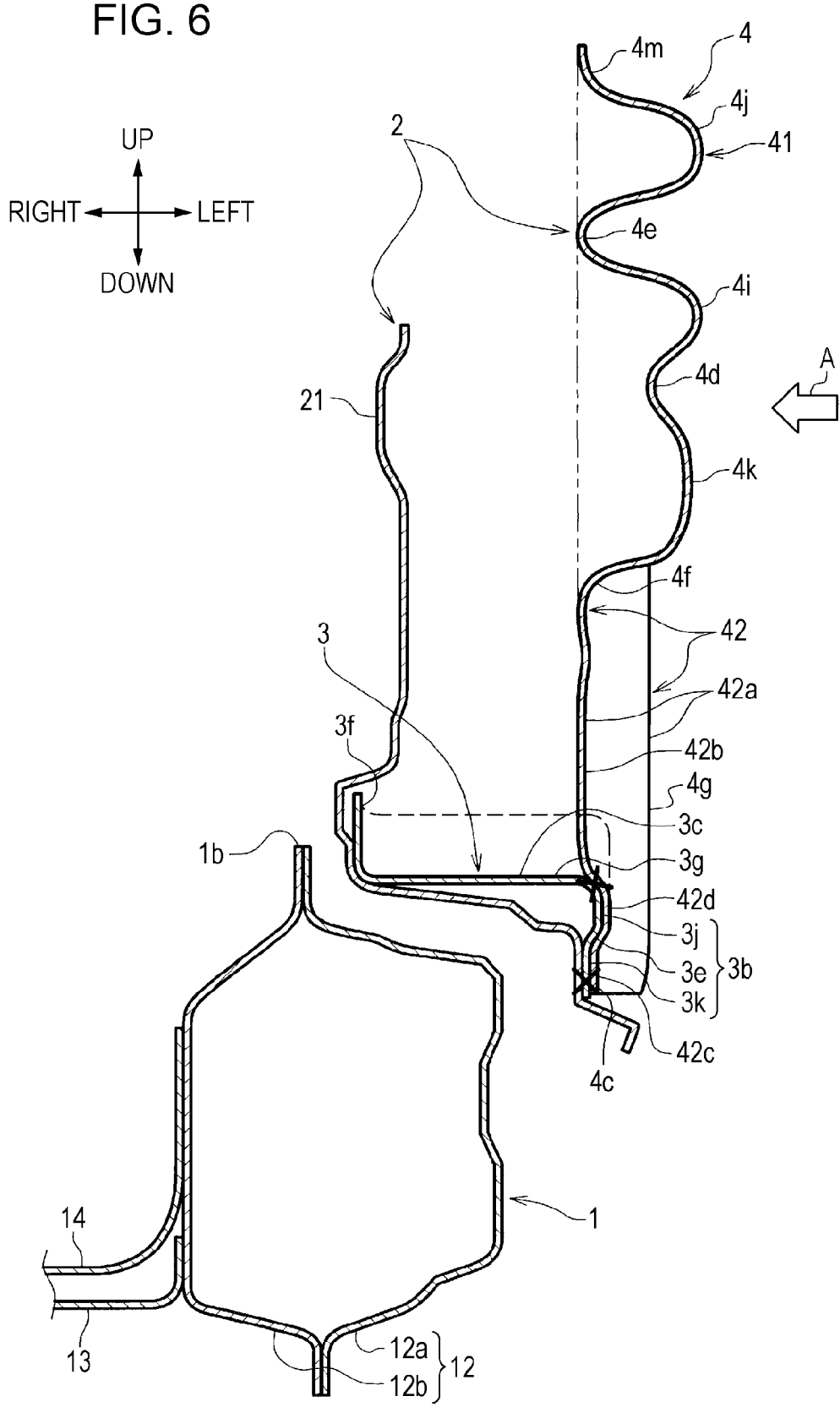
FIG. 6 is an enlarged end view taken along line VI-VI of FIG. 4.

The side sill 12 is a member extending towards the rear side of the vehicle body from a lower end side of a front end of the door opening 1b and forms a lower side frame portion of the door opening 1b. As illustrated in FIG. 6, the side sill 12 is formed in a hollow shape by joining an outer member 12a disposed on the vehicle outer side and an inner member 12b disposed on the vehicle inner side into a tubular shape. A floor panel 13 that forms a floor surface and a cross member 14 that is extended in the left-right direction are provided on the vehicle inner side of the side sill 12.

As illustrated in FIG. 1, the floor panel 13 is formed of a rolled steel plate and is bridged across between the left and right side sills 12 and 12.

Figure 3:
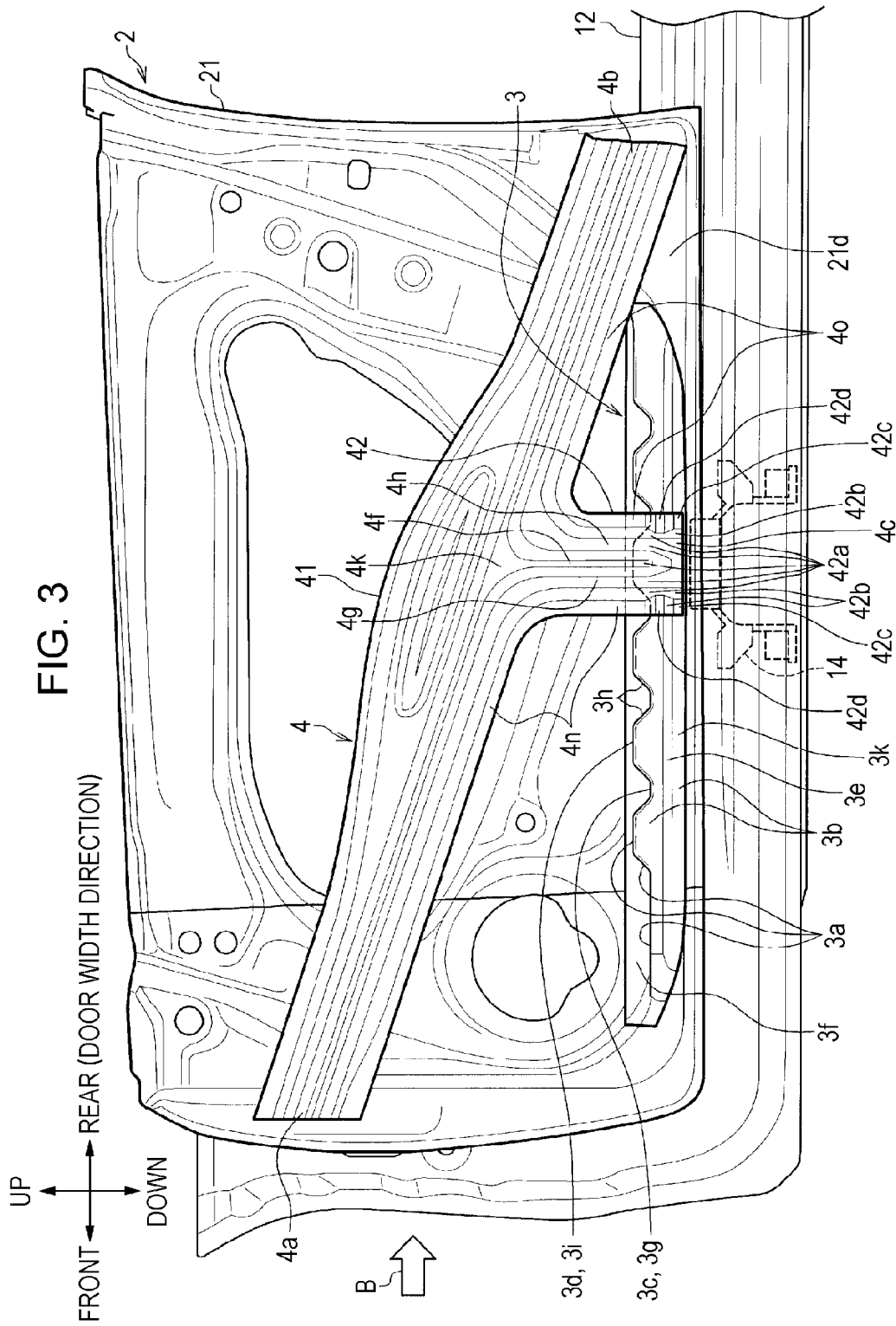
FIG. 3 is a schematic side view illustrating an essential portion of the vehicle door.
Figure 4:
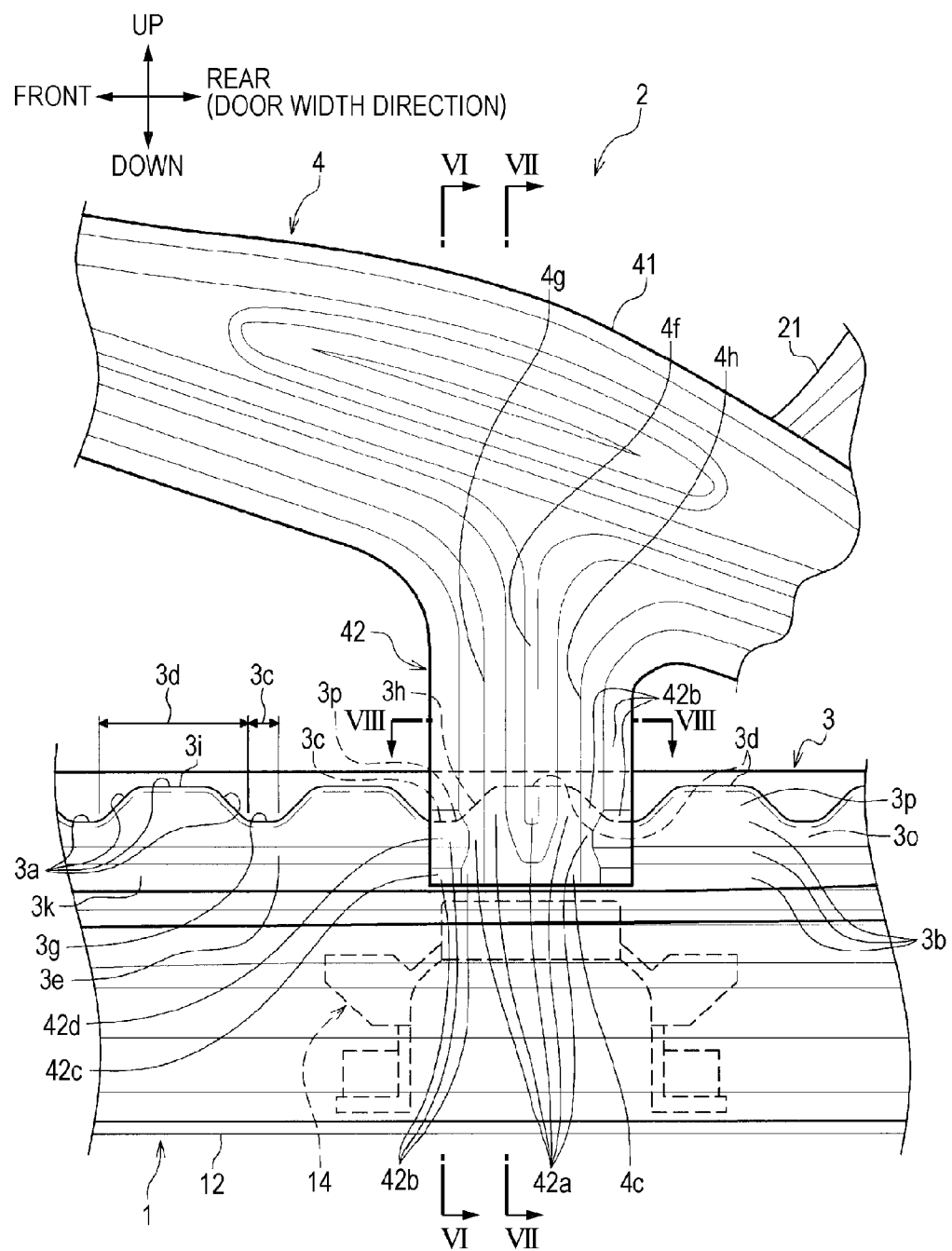
FIG. 4 is an enlarged view of a middle portion of the lower portion of FIG. 3.

The cross member 14 is formed of a member that has a polygonal and tubular shape in longitudinal sectional view and is joined to the lateral surfaces of the left and right side sills 12 and 12 on the vehicle inner side. As illustrated in FIGS. 3 and 4, in order to efficiently absorb a crash induced load caused by a side impact, the cross member 14 is joined to a portion of the side sill 12 below the position where a lower reinforcing member 3 described later and a lower end portion 4c of a beam extension portion 42 of the door beam 4 are attached in an overlapping state with respect to each other in side view (when viewed in a vehicle inside-outside direction).

[Door]

As illustrated in FIG. 1, the door 2 is, for example, a hinged door, a slide door, or a gullwing door that is disposed in the vehicle body lateral portion 1a. The door 2 may be any of the front doors, rear doors, and a back door, the back door being disposed in the rear surface of the vehicle body 1, that open and close the door opening 1b provided in the vehicle body lateral portion 1a. The door 2 may be any type of door as long as the door beam 4 is installed therein. Hereinafter, as an example of the door 2, a hinged rear-opening type front door that is disposed in the vehicle body lateral portion 1a on the left side of the vehicle body 1 will be described.

The door 2 mainly includes an inner panel that is disposed on the vehicle inner side and that constitutes a door body 21, an outer panel (not shown) that is installed on the vehicle outer side of the door body 21, the lower reinforcing member 3 that extends in the front-rear direction (a door width direction) at a lower end inside the door body 21, and the door beam 4 that is provided in the door body 21. Other than the above, the door 2 also includes a sash in which a window glass is provided so as to be capable of being elevated and lowered, a lining that is installed on the vehicle inner side of the door body 21, a hinge member for pivotally attaching the door 2 to the vehicle body 1, and electrical components, such as a door lock device, a window device, and a harness (all not shown).

(Door Body)

As illustrated in FIG. 1, the door body 21 is a door inner member (the inner panel) that constitutes a frame of the door 2 and is, for example, formed of a rolled steel plate formed in a substantially square shape. A peripheral portion of the outer panel (not shown) is attached to an outer peripheral portion of the door body 21 by a hemming process and by welding. The side on the front end portion of the door body 21 is coupled to the front pillar lower 11 with a pair of upper and lower hinge members (not shown) so as to open and close the door 2. The rear end portion of the door body 21 is maintained in a door-closed state with the door lock device (not shown). The door body 21 includes a front side beam attaching portion 21a, a rear side beam attaching portion 21b, and a lower side beam attaching portion 21c to which a front end portion 4a, a rear end portion 4b, and the lower end portion 4c, respectively, of the door beam 4 formed in a substantially T-shape are joined by spot welding.

(Outer Panel)

The outer panel (not shown) is a door skin that is disposed on the outer side of the door body 21 and, for example, is formed by press working a single piece of rolled steel plate. A door handle (not shown) is disposed in the vicinity of the rear end portion of the outer panel.

(Lower Portion Reinforcing Member)

Figure 2:
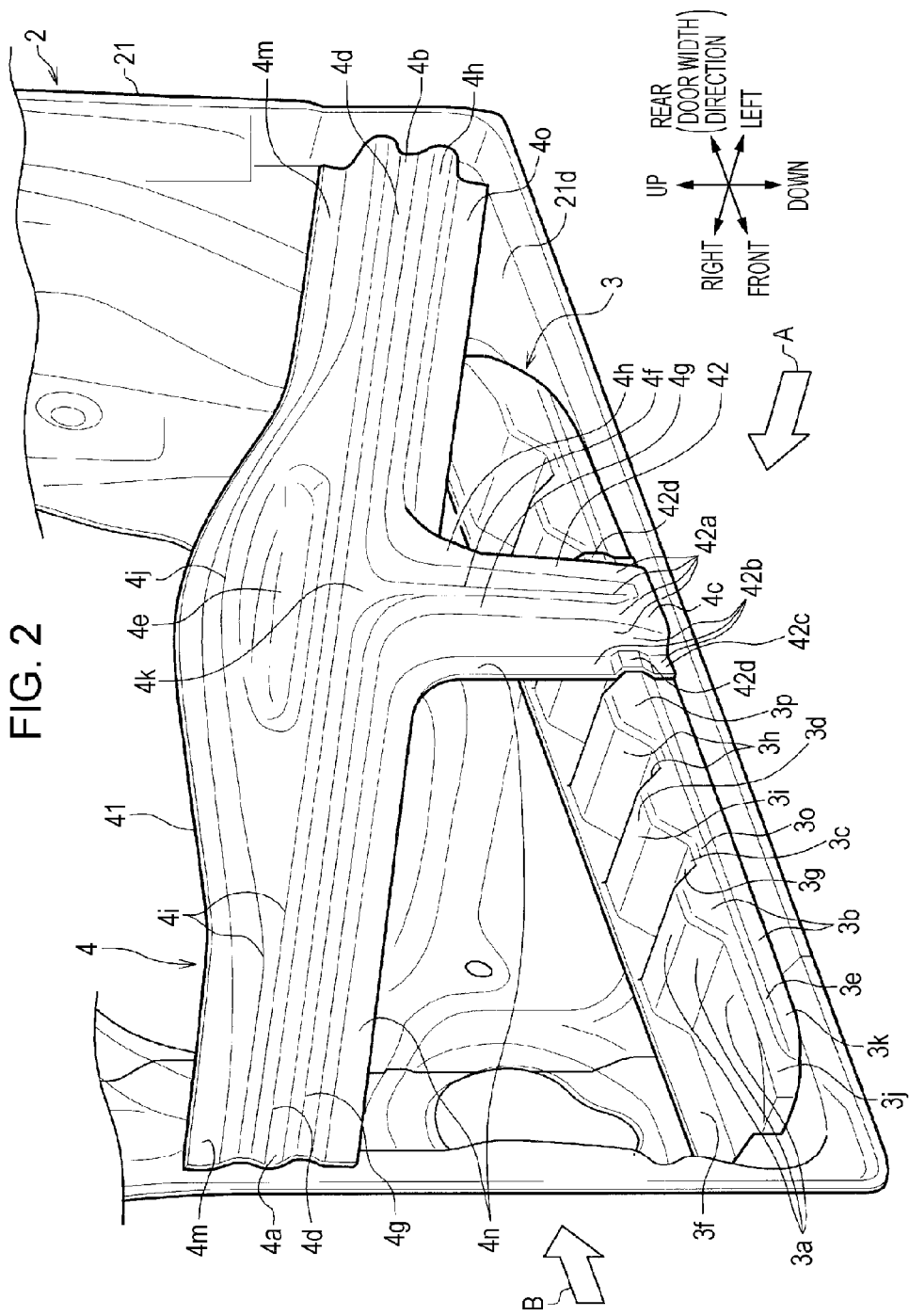
FIG. 2 is an enlarged view of a lower portion of the door illustrated in FIG. 1.

As illustrated in FIG. 2, the lower reinforcing member 3 is a frame member for reinforcing a lower end portion of the door body 21 and, for example, is formed by press forming a single piece of steel plate. In plan view (when viewed from above), the lower reinforcing member 3 includes upper surfaces 3a extending in the front-rear direction, an outer side surface 3b extending downwards from left end portions (end portions on the vehicle outer side) of the upper surfaces 3a, and a vehicle interior surface 3f extending upwards from the right side (the vehicle inner side) of the upper surfaces 3a, and the lower reinforcing member 3 is formed with a shape resembling a so-called Z-steel in longitudinal sectional view (see FIG. 6). As illustrated in FIG. 1, the lower reinforcing member 3 is joined onto a lower inner frame portion 21d formed in the lower end portion of the door body 21.

As illustrated in FIG. 2, the upper surfaces 3a are surfaces on the upper side that become visible when the lower reinforcing member 3 is seen in plan view. As illustrated in FIG. 4, the upper surfaces 3a are formed of a plurality of concave portions 3c and a plurality of convex portions 3d that are formed in a substantially mountainous shape that protrudes upwards from between the concave portions 3c. In the upper surfaces 3a, a concave portion 3c and a convex portion 3d are alternately juxtaposed a plurality of times in the front-rear direction so as to form a substantially rack tooth form (a consecutive concave-convex shape). As illustrated in FIGS. 6 and 7, the upper surfaces 3a are formed from the upper end of the outer side surface 3b to the vehicle interior surface 3f when viewed in the front-rear direction.

Figure 5:
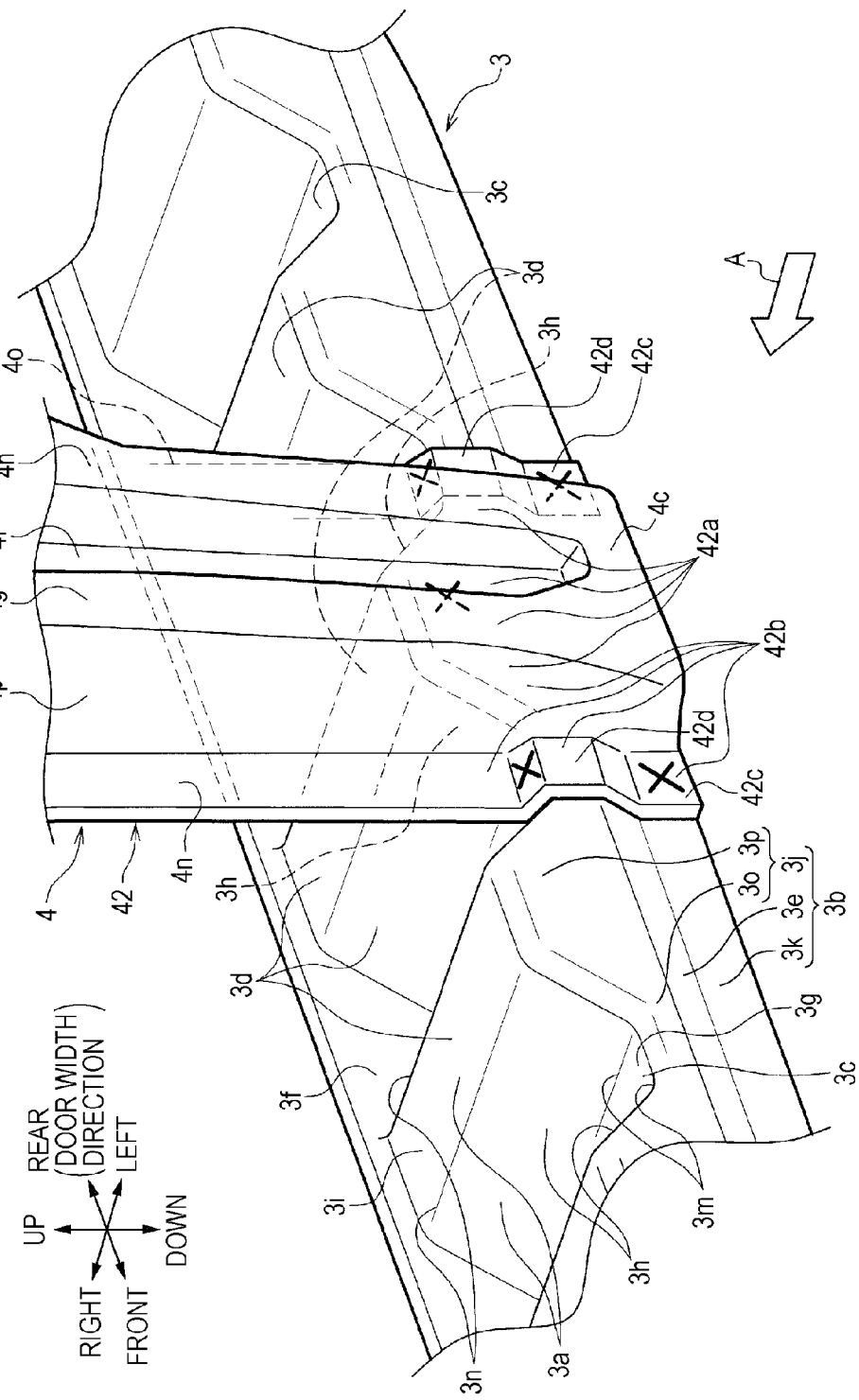
FIG. 5 is an enlarged perspective view of an essential portion illustrating an installed state of a beam extension portion of the door beam.

As illustrated in FIG. 5, the convex portions 3d are mountainous shaped portions formed in a trapezoidal thread shape in side view and are each formed in a hat shape in longitudinal sectional view. The convex portions 3d are each formed of a flat convex portion top face 3i formed on the upper end thereof and inclined surfaces 3h and 3h that are formed obliquely downwards from the two edge portions of the convex portion top face 3i in the front-rear direction. For example, six convex portions 3d are formed on the upper surfaces 3a of the lower reinforcing member 3.

The concave portions 3c are inner bottom portions of grooves formed in a depressed manner between the convex portions 3d and 3d (see FIG. 4). The concave portions 3c are each formed of a flat concave portion bottom surface 3g that is formed between the inclined surfaces 3h and 3h. The concave portions 3c (the concave portion bottom surfaces 3g), the convex portions 3d, and the inclined surfaces 3h and 3h are provided so as to extend in the left-right direction. For example, six concave portions 3c are formed in the lower reinforcing member 3 (see FIG. 2).

Accordingly, as illustrated in FIG. 5, the strength of the upper surfaces 3a are improved by ridge lines 3m that are formed in the bent portions extending in the left-right direction between the concave portion bottom surface 3g and the inclined surfaces 3h and 3h at the front and rear end portions of the concave portion bottom surface 3g and by ridgelines 3n that are formed in the bent portions extending in the left-right direction between the front and rear end portions of the convex portion top face 3i and the inclined surfaces 3h and 3h.

The outer side surface 3b is a left lateral side of the lower reinforcing member 3 (see FIGS. 6 and 7). The outer side surface 3b is formed by the concave portion bottom surfaces 3g, an upper outer side surface 3j formed so as to bend downwards with a rounded portion from the left ends of the inclined surfaces 3h and the convex portion top faces 3i, an underside 3e that is formed so as to bend obliquely downwards towards the right side (the vehicle inner side) from the lower end of the upper outer side surface 3j, and a lower outer side surface 3k that is formed so as to bend towards the lower side from the lower end portion of the underside 3e.

As illustrated in FIG. 5, the upper outer side surface 3j, the underside 3e, and the lower outer side surface 3k extend in the front-rear direction (the door width direction).

The upper outer side surface 3j includes a vertical wall surface that is formed from the left ends of the concave portion bottom surfaces 3g, the inclined surfaces 3h, and the convex portion top faces 3i to the upper end of the underside 3e. The upper outer side surface 3j includes concave portion-abutting side surfaces 3o that are formed from the concave portion bottom surfaces 3g to the upper end of the underside 3e, and convex portion-abutting side surfaces 3p that are formed from the convex portions 3d (the inclined surfaces 3h and the convex portion top faces 3i) to the upper end of the underside 3e. The upper outer side surface 3j is arranged at the leftmost position of the lower reinforcing member 3 when viewed in the front-rear direction (see FIGS. 6 and 7).

The width of the concave portion-abutting side surfaces 3o in the up-down direction is formed smaller than the width of the convex portion-abutting side surfaces 3p in the up-down direction, and two concave portion-abutting side surfaces 3o, among the plurality of the concave portion-abutting side surfaces 3o, are engaged with concave-abutting-side engagement portions 42d and 42d described later.

The width of the convex portion-abutting side surfaces 3p in the up-down direction is formed larger than the width of the concave portion-abutting side surfaces 3o in the up-down direction, and an extension portion body 42a including inner extension portions (engagement portions) 42b is disposed on one of the convex portion-abutting side surfaces 3p, among the plurality of convex portion-abutting side surfaces 3p, that is positioned in the middle portion of the lower reinforcing member 3 so as to overlap the one of the convex portion-abutting side surfaces 3p from the vehicle outer side.

The underside 3e that extends in the front-rear direction includes an oblique wall surface formed from the lower end of the upper outer side surface 3j to the upper end of the lower outer side surface 3k. The underside 3e is inclined so as to be positioned more on the vehicle inner side as the underside 3e approaches the lower outer side surface 3k.

The lower outer side surface 3k that extends in the front-rear direction includes a vertical wall surface that is formed from the lower end of the underside 3e to the lower end of the lower reinforcing member 3.

The vehicle interior surface 3f includes a vertical wall surface that is formed so as to bend upwards with a rounded portion from the right ends (vehicle inner side end portions) of the concave portion bottom surfaces 3g, the inclined surfaces 3h, and the convex portion top faces 3i to the upper end of the lower reinforcing member 3.

[Door Beam]

As illustrated in FIG. 2, the door beam 4 is a reinforcing member that is installed inside the door 2. The door beam 4 is formed of a steel plate and is formed by press forming a single piece of rolled steel plate into a substantially T-shape in side view. In other words, the door beam 4 mainly includes a beam body portion 41 extending in the front-rear direction at a portion above the lower reinforcing member 3 inside the door body 21, and the beam extension portion 42 extending downwards from the middle portion of the beam body portion 41, which are integrally formed with respect to each other. The front end portion 4*a*, the rear end portion 4*b*, and the lower end portion 4*c* of the door beam 4 are fixed to the door body 21 by welding, such as spot welding, or by mechanical fixing members, such as nuts and bolts, or rivets.

(Beam Body Portion)

As illustrated in FIG. 2, the beam body portion 41 is a portion, which is inside the door beam 4, extending in the front-rear direction at a portion above the lower reinforcing member 3 provided inside the door 2. As illustrated in FIG. 3, in the beam body portion 41, the front end portion 4*a* is fixed to the upper front end portion of the door body 21 and the rear end portion 4*b* is fixed to the lower rear end portion of the door body 21. Accordingly, the beam body portion 41 extends in a straight manner while inclining downwards towards the rear from the front end portion 4*a* towards the rear end portion 4*b*. In side view, the front end portion 4*a* side and the rear end portion 4*b* side of the beam body portion 41 are formed so as to have substantially equal top to bottom widths, and the middle portion of the beam body portion 41 is formed with a width that is larger than the top to bottom widths. The beam body portion 41 is reinforced by being formed, in longitudinal sectional view, in a wavelike shape in its entirety from the front end portion 4*a* to the rear end portion 4*b* (see FIGS. 6 and 7).

As illustrated in FIG. 2, a recessed transverse groove portion 4*d*, a recessed hole portion 4*e*, a connection portion 4*k*, an upper flange 4*m*, a lower front flange 4*n*, and a lower rear flange 4*o*, each of which will be described later, are formed in the beam body portion 41.

(Beam Extension Portion)

As illustrated in FIGS. 2 and 3, the beam extension portion 42 is a portion that is extended downwards from the connection portion 4*k* at the middle portion of the lower end of the beam body portion 41 in the front-rear direction towards the lower end portion 4*c*. As illustrated in FIG. 5, the lower front flange 4*n*, the lower rear flange 4*o*, lower extension portions 42*c*, the concave-abutting-side engagement portions 42*d*, a recessed longitudinal groove portion 4*f*, a first bead portion 4*g*, a second bead portion 4*h*, the inner extension portions 42*b*, and the lower end portion 4*c* that is joined to the lower reinforcing member 3, each of which will be described later, are formed in the beam extension portion 42.

As illustrated in FIG. 8, since the first bead portion 4*g*, the second bead portion 4*h*, and the recessed longitudinal groove portion 4*f* are formed in the beam extension portion 42 above the lower end portion 4*c*, the beam extension portion 42 is formed in a substantially wavelike shape.

The extension portion body 42*a* is a portion formed between the lower front flange 4*n* on the front side and the lower rear flange 4*o* on the rear side in the beam extension portion 42 extending in the up-down direction. The extension portion body 42*a* is formed of the recessed longitudinal groove portion 4*f*, the first bead portion 4*g*, the second bead portion 4*h*, and the inner extension portions 42*b* and 42*b* that continuously extend downwards from the beam body portion 41 (see FIG. 2) and is reinforced by being formed in a wavelike shape. As illustrated in FIG. 4, in side view, the extension portion body 42*a* is disposed so as to overlap, from the vehicle outer side, the convex portion-abutting side surface 3*p* of the outer side surface 3*b* that extends downwards from the convex portion 3*d* (the inclined surfaces 3*h* and the convex top face 3*i*) of the lower reinforcing member 3. As illustrated in FIG. 5, the extension portion body 42*a* is welded to the convex portion-abutting side surface 3*p* at the recessed longitudinal groove portion 4*f* between the first bead portion 4*g* and the second bead portion 4*h*.

As illustrated in FIG. 5, the inner extension portions 42*b* are, when viewed in the front-rear direction, portions that are extended towards the vehicle inner side at portions above the concave portions 3*c* from the vehicle outer side end portion of the convex first bead portion 4*g* and second bead portion 4*h* that protrude towards the vehicle outer side. The inner extension portions 42*b* include the lower front flange 4*n* and the lower rear flange 4*o* adjoined to the two end sides of the extension portion body 42*a* in the front-rear direction, a bead front side inclination portion 4*p* (see FIG. 8) that is formed from a portion in front of the apex of the first bead portion 4*g* towards the lower front flange 4*n*, and a bead rear side inclination portion 4*q* (see FIG. 8) that is formed from a portion behind the apex of the second bead portion 4*h* towards the lower rear flange 4*o*. In side view, the inner extension portions 42*b* are formed in the up-down direction at the front and behind the first and second bead portions 4*g* and 4*h*. In plan view, in the inner extension portions 42*b*, the lower front flange 4*n* and the lower rear flange 4*o* are disposed at positions that are the same as those of the concave portions 3*c* and 3*c*, and the bead front side inclination portion 4*p* and the bead rear side inclination portion 4*q* (see FIG. 8) are disposed at positions that are the same as those of the inclined surfaces 3*h* and 3*h*. As illustrated in FIG. 8, each of the two front and rear inner extension portions 42*b* are disposed so as to extend into a portion above the corresponding concave portion 3*c* and are welded to the concave portion bottom surface 3*g* of the corresponding concave portion 3*c* in the up-down direction (from the upper side). Furthermore, the lower extension portions 42*c* and 42*c* of the inner extension portions 42*b* and 42*b* below the concave portions 3*c* and 3*c* are joined to the lower outer side surface 3*k* by spot welding (see FIG. 8). Note that the X Marks in FIGS. 5, 6, and 8 indicate the welding positions where the beam extension portion 42 and the lower reinforcing member 3 are joined to each other.

As illustrated in FIG. 5, the lower extension portions 42*c* are portions that are formed in the lower end portion 4*c* of the lower front flange 4*n* and the lower rear flange 4*o* of the beam extension portion 42. The lower extension portions 42*c* are formed flat in the up-down and front-rear directions. The lower extension portions 42*c* are disposed below the underside 3*e* and, in plan view, are disposed so as to overlap the underside 3*e* (see FIG. 8). The lower extension portions 42*c* are formed in the two front and rear portions of the lower end portion 4*c* of the beam extension portion 42 and, in side view, are disposed at positions below the adjoining concave portions 3*c* and 3*c*.

The concave-abutting-side engagement portions 42*d* are convex portions that are formed by being bent in a screw thread shape of a trapezoidal screw thread, when viewed in the front-rear direction, at the lower end portion 4*c* of the lower front flange 4*n* and the lower area flange 4*o*. When viewed in the front-rear direction, the concave-abutting-side engagement portions 42*d* are engaged with portions that are formed by the end portions of the concave portions 3*c* on the vehicle outer side in the vehicle inside-outside direction, the concave portion-abutting side surfaces 3*o*, and the underside 3*e* so as to protrude out in a U-shape towards the vehicle outer side with respect to the lower outer side surface 3*k*.

As illustrated in FIG. 2, the recessed transverse groove portion 4*d* is formed of a groove formed in a substantially U-shape in the longitudinal sectional view of the beam body portion 41 (see FIG. 6) and is formed from the front end portion 4*a* to the rear end portion 4*b* along a center line of the beam body portion 41.

The recessed hole portion 4e is a long hole-shaped depression that is formed in the middle portion of the beam body portion 41 in the front-rear direction. The recessed hole portion 4e is, in side view, formed long sideways between a third bead portion 4i formed above the recessed transverse groove portion 4d, and a fourth bead portion 4j formed in an arc shape that is curved upwards.

The recessed longitudinal groove portion 4f is formed of a groove formed in a substantially U-shape in the cross-sectional view of the beam extension portion 42 (see FIG. 8) and is formed in the up-down direction along the center line of the beam extension portion 42 from the middle portion of the recessed transverse groove portion 4d to the lower end portion 4c of the beam extension portion 42.

As illustrated in FIG. 2, in longitudinal sectional view, the first to fourth bead portions 4g to 4j are each formed in a convex mountain shape and ridgelines are formed with the apexes that extend in a continuous ridge shape serving as a reinforcement of the steel plate door beam 4 (see FIGS. 6 to 8).

The first bead portion 4g is provided so as to extend from the front end portion 4a of the beam body portion 41 to the lower end portion 4c of the beam extension portion 42 and is formed so as to be curved at a substantially right angle in side view. The first bead portion 4g has a uniform top to bottom width from the front end portion 4a to the connection portion 4k at the middle portion of the beam body portion 41. The first bead portion 4g extends in a straight manner along the beam body portion 41 while inclining downwards towards the rear and extends towards the lower end portion 4c from the middle portion of the beam body portion 41.

The second bead portion 4h is provided so as to extend from the rear end portion 4b of the beam body portion 41 to the lower end portion 4c of the beam extension portion 42 in a continuous manner and is formed so as to be curved at a substantially right angle in side view. In the beam extension portion 42, the first bead portion 4g and the second bead portion 4h are arranged so as to oppose each other with the recessed longitudinal groove portion 4f interposed in between.

As illustrated in FIGS. 4 and 5, in side view, the first bead portion 4g and the second bead portion 4h are disposed so as to overlap, from the vehicle outer side, the outer side surface 3b that extends downwards from the convex portion 3d of the lower reinforcing member 3. Furthermore, the first bead portion 4g and the second bead portion 4h are formed on the front side and the rear side with the recessed longitudinal groove portion 4f in between and are formed so as to continuously extend to a portion below the underside 3e of the lower reinforcing member 3.

As illustrated in FIG. 2, the third bead portion 4i is formed in the beam body portion 41 so as to extend in a substantially straight manner from the front end portion 4a to the rear end portion 4b. The third bead portion 4i is extended in the front-rear direction in a substantially parallel manner with respect to the beam body portion 41. The third bead portion 4i is integrated and forms a common section with the fourth bead portion 4j at the front end portion 4a and the rear end portion 4b of the beam body portion 41.

In the beam body portion 41, the portions of the fourth bead portion 4j that is common with the third bead portion 4i on the front end portion 4a side and the rear end portion 4b side extend in a straight manner, and a portion between the front end portion 4a side and the rear end portion 4b side of the beam body portion 41 is formed in a curve that is raised upwards so as to avoid the recessed hole portion 4e at the middle portion of the beam body portion 41.

As illustrated in FIG. 2, the connection portion 4k is a portion in which the beam body portion 41 and the beam extension portion 42 are connected to each other. In the door beam 4, the middle portion of the connection portion 4k is formed between the first bead portion 4g and the second bead portion 4h in a shape of an inverted triangle. In the connection portion 4k, the recessed longitudinal groove portion 4f is formed in a straight line from the middle portion of the connection portion 4k towards the lower end portion 4c.

The upper flange 4m is a flat plate-shaped edge portion adjoined above and along the fourth bead portion 4j. In the beam body portion 41, the upper flange 4m is formed in a substantially straight manner along the third bead portion 4i at the front end portion 4a and the rear end portion 4b and is, at the middle portion of the beam body portion 41, formed in an arc that is curved along the fourth bead portion 4j so as to be raised upwards. Accordingly, the middle portion of the beam body portion 41 is formed wider in the up-down direction with respect to the front end portion 4a and the rear end portion 4b.

The lower front flange 4n is a flat plate-shaped edge portion that is continuously formed along the first bead portion 4g from the edge portion on the lower end side of the front end portion 4a of the beam body portion 41 to the edge portion on the front side of the lower end portion 4c of the beam extension portion 42. The first bead portion 4g includes a flat plate-shaped flange portion formed so as to be curved at a substantially right angle in side view. The concave-abutting-side engagement portion 42d and the lower extension portion 42c are formed in the lower end portion 4c of the lower front flange 4n.

As illustrated in FIG. 3, the lower rear flange 4o is a flat plate-shaped edge portion that is continuously formed along the second bead portion 4h from the lower edge portion of the rear end portion 4b of the beam body portion 41 to the edge portion on the rear side of the lower end portion 4c of the beam extension portion 42. The lower rear flange 4o is provided from the rear end portion 4b of the beam body portion 41 to the lower end portion 4c of the beam extension portion 42 and is formed so as to be curved at a substantially right angle in side view. Similar to the lower front flange 4n, the concave-abutting-side engagement portion 42d and the lower extension portion 42c are formed in the lower end portion 4c of the lower rear flange 4o.

The beam body portion 41 formed as above is, as illustrated in FIG. 1, bridged across in the door 2 from the upper front end portion to the lower rear end portion of the door body 21 and is disposed so as to be inclined upwards towards the front in the front-rear direction. As illustrated in FIGS. 6 and 7, the beam body portion 41 is reinforced by being formed in a wavelike shape in longitudinal sectional view with the upper flange 4m, the fourth bead portion 4j, the recessed hole portion 4e, the third bead portion 4i, the recessed transverse groove portion 4d, and the like.

Furthermore, as illustrated in FIG. 5, the beam extension portion 42 is reinforced by being formed in a wavelike shape in cross-sectional view (see FIG. 8) by having the recessed longitudinal groove portion 4f, the first bead portion 4g, the second bead portion 4h, the lower front flange 4n, and the lower rear flange 4o be formed so as to extend in the up-down direction.

Effects

Effects of the vehicle door according to the exemplary embodiment of the present disclosure will be described next with reference to each drawing while mainly referring to FIGS. 1 to 5.

(Upon Side Impact)

For example, when a crash induced load (arrow A) is applied to the door 2 illustrated in FIG. 1 from the left direction upon side collision between the vehicle C and another vehicle or the like, the outer panel (not shown) first receives the crash induced load. The outer panel is depressed towards the vehicle inner side and pushes the door beam 4 in the right direction. Since the door 2 is provided with the door beam 4 having a substantially T-shape in side view and the lower reinforcing member 3 extending in the front-rear direction, the door 2 is reinforced against the crash induced load (arrow A) upon side impact.

As illustrated in FIG. 2, since the plurality of convex portions 3d and concave portions 3c that are each formed on the upper surfaces 3a in the left-right direction are provided in the lower reinforcing member 3 in the front-rear direction, the rigidity of the lower reinforcing member 3 is increased accordingly with the inclined surfaces 3h included in the upward protruding convex portions 3d.

As illustrated in FIG. 5, in side view, the beam extension portion 42 of the door beam 4 includes the extension portion body 42a that is disposed so as to overlap the outer side surface 3b (the convex portion 3d and the convex portion-abutting side surface 3p) from the vehicle outer side; accordingly, upon side impact, the crash induced load (arrow A) transmitted through the beam body portion 41 (see FIG. 2) and the beam extension portion 42 can be received by the convex portion 3d of the lower reinforcing member 3 that has high rigidity. Accordingly, as illustrated in FIGS. 6 and 7, upon side impact, deformation of the beam extension portion 42 is suppressed with the lower reinforcing member 3, and the side impact load can be efficiently and effectively transmitted to the door body 21 and the vehicle body 1 (the side sill 12 and the cross member 14).

Furthermore, as illustrated in FIG. 5, when viewed in the front-rear direction, the beam extension portion 42 is disposed such that the inner extension portions 42b overlaps a portion of the inclined surfaces 3h of the convex portion 3d above the concave portions 3c (see FIG. 8). Accordingly, upon collision, even if the door beam 4 receives a crash induced load that displaces the door beam 4 in the front-rear direction, since reinforcement is provided by disposing the inclined surfaces 3h and 3h at both ends of the convex portion top face 3i in the front-rear direction and the inner extension portions 42b in an engaged state in plan view, displacement of the door beam 4 in the front-rear direction can be suppressed. As a result, since the inner extension portions 42b disposes the beam extension portion 42 so that the beam extension portion 42 reliably abuts against the inclined surfaces 3h of the convex portion 3d improving the rigidity of the lower reinforcing member 3 and so that the strength of the joined portion between the lower reinforcing member 3 and the beam extension portion 42 is improved, upon collision, tear between the lower reinforcing member 3 and the beam extension portion 42 can be suppressed.

Furthermore, the beam extension portion 42 engages the concave-abutting-side engagement portions 42d to concave portions 3c of the lower reinforcing member 3; accordingly, displacement of the beam extension portion 42 in the up-down direction upon side impact can be suppressed and rigidity that prevents deformation and distortion caused by the side impact load can be improved.

Furthermore, as illustrated in FIGS. 6 and 7, the strength of the outer side surface 3b is increased by forming the underside 3e in a bent manner in the left-right direction between the upper outer side surface 3j and the lower outer side surface 3k that are formed in the up-down direction in front view.

Accordingly, the outer side surface 3b functions to suppress deformation of the upper surfaces 3a (the concave portions 3c and the convex portions 3d) caused by the load upon collision.

Furthermore, the vehicle interior surface 3f is formed so as to bend upwards from the right end (the end portion on the vehicle inner side) of the upper surfaces 3a (the concave portions 3c and the convex portions 3d); accordingly, the vehicle interior surface 3f functions to suppress deformation of the upper surfaces 3a (the concave portions 3c and the convex portions 3d) caused by the load upon collision.

Furthermore, as illustrated in FIGS. 5 and 8, when viewed in the up-down direction, the beam extension portion 42 includes the lower extension portions 42c that overlap the underside 3e of the lower reinforcing member 3; accordingly, rigidity can be increased by arranging the underside 3e and the lower extension portions 42c in an engaged state. Accordingly, the underside 3e and the lower extension portions 42c can suppress the beam extension portion 42 from being displaced upwards upon collision.

Furthermore, in the lower extension portions 42c, the concave-abutting-side engagement portions 42d are provided at positions that are the same as the positions of the concave portions 3c in side view; accordingly, at positions around the concave portions 3c, the inner extension portions 42b, the lower extension portions 42c, and the concave-abutting-side engagement portions 42d are disposed so as to be in an engaged state in the up-down direction with the inclined surfaces 3h, the lower outer side surface 3k, the convex portion-abutting side surfaces 3p, and the concave portion-abutting side surfaces 3o. Accordingly, since the door beam 4 can dispose the extension portion body 42a including the first bead portion 4g and the second bead portion 4h so as to overlap the entire convex portion 3d, transmission efficiency of the crash induced load to the door body 21 and the vehicle body 1 upon side impact can be increased.

Furthermore, as described above, in the door beam 4, the inner extension portions 42b are disposed so as to be in an engaged state with the inclined surfaces 3h of the lower reinforcing member 3 while being joined on the concave portion bottom surfaces 3g (the upper surfaces 3a) of the concave portions 3c, and the concave-abutting-side engagement portions 42d are disposed so as to be in an engaged state with the concave portion-abutting side surfaces 3o, the concave portions 3c, and the underside 3e. As a result, the lower end portion 4c of the beam extension portion 42 is reinforced and the joint strength thereof is increased; accordingly, displacement in the up-down direction upon collision can be suppressed.

In side view, the first bead portion 4g, the second bead portion 4h, and the recessed longitudinal groove portion 4f of the extension portion body 42a formed in the beam extension portion 42 are disposed so as to overlap the convex portion 3d of the lower reinforcing member 3. Accordingly, upon collision, the crash induced load applied to the beam extension portion 42 can be transmitted to and received by the convex portion 3d, which has high rigidity, of the lower reinforcing member 3 through the first bead portion 4g, the second bead portion 4h, and the recessed longitudinal groove portion 4f.

Since in the beam extension portion 42, the first bead portion 4g and the second bead portion 4h that continuously extend from the beam body portion 41 are continuously extended to the portions of the lower extension portions 42c that is below the underside 3e, large contact areas between the first bead portion 4g and the second bead portion 4h, and the convex portion 3d are obtained and strength is increased. Furthermore, since the lower end portion 4c of the beam extension portion 42 is disposed and is joined to the convex portion 3d, the concave portions 3c, and the outer side surface 3b of the lower reinforcing member 3 with which strength has been increased, the joint strength with the lower reinforcing member 3 is increased. Accordingly, upon side impact, the lower end portion 4c of the beam body portion 41 can suppress tear in the joined portion between the beam extension portion 42 and the lower reinforcing member 3, and the efficiency of the crash induce load transmitted to the door body 21 and the vehicle body 1 can be increased.

As described above, in the vehicle door according to the exemplary embodiment of the present disclosure, the lower reinforcing member 3 that is provided in the lower portion of the door body 21 includes the convex portions 3d, the concave portions 3c, and the like; accordingly, the rigidity of the door 2 can be increased. As described above, in the door beam 4, since the recessed longitudinal groove portion 4f, the first bead portion 4g, the second bead portion 4h, the lower extension portions 42c, and the concave-abutting-side engagement portions 42d are formed in the beam extension portion 42, the rigidity of the door beam 4 and the joint strength between the door beam 4 and the lower reinforcing member 3 can be increased; accordingly, upon side impact, displacement of the beam extension portion 42 of the door beam 4 can be suppressed.

(Upon Front Collision)

For example, when a crash induced load (arrow B) is applied to the door 2 illustrated in FIG. 1 from the front direction upon front collision or the like between the vehicle C and another vehicle or the like, the door 2 receives a compressive load in the front-rear direction. Since the door 2 is provided with the beam body portion 41 of the door beam 4 that extends in the front-rear direction and the lower reinforcing member 3 extending in the front-rear direction, the door 2 is reinforced against the crash induced load (arrow B), such as the compressive load, upon front collision.

As illustrated in FIG. 2, since the third bead portion 4i, the fourth bead portion 4j, and the recessed transverse groove portion 4d are formed from the front end portion 4a to the rear end portion 4b and extend in a substantially straight manner in the front-rear direction, the beam body portion 41 has strength against the crash induced load (arrow B) in the front-rear direction in particular.

Furthermore, the door beam 4 is formed in a substantially T-shape with the beam body portion 41 extending in the front-rear direction and the beam extension portion 42 extending in the up-down direction. Regarding the portion around the connection portion 4k at the substantially middle portion of the door beam 4, the recessed longitudinal groove portion 4f is formed in a groove shape in the up-down direction between the first bead portion 4g (the bead portion) and the second bead portion 4h from the connection portion 4k to the lower end portion 4c. Accordingly, in the door beam 4, a fragile portion that is weaker in strength than those of the front end portion 4a side and the rear end portion 4b side of the beam body portion 41 is formed in the portion from the connection portion 4k at the middle between the first bead portion 4g and the second bead portion 4h to the recessed longitudinal groove portion 4f. For example, when the crash induced load (arrow B) in the front-rear direction is large, the door beam 4 functions to absorb the impact force by being deformed in such a manner that the first bead portion 4g and the second bead portion 4h are bent and separated into two at a portion around the connection portion 4k as the center.

In other words, the first bead portion 4g on the front end portion 4a side and the second bead portion 4h on the rear end portion 4b side are not connected to each other; accordingly, the door beam 4 is formed so that the portion between the first bead portion 4g and the second bead portion 4h is bent first when receiving the crash induced load (arrow B) in the front-rear direction.

When receiving the crash induced load (arrow B) in the front-rear direction, the door beam 4 is deformed in the above bent state; accordingly, since the connection portion 4k and the recessed longitudinal groove portion 4f are fragile portions that are relatively easily bent with respect to the other portions, the door beam 4 can be made to be broken at the fragile portion as an origin of the break.

In the door beam 4, a portion from the front end portion 4a of the beam body portion 41 to the portion around the connection portion 4k, a portion from the rear end portion 4b of the beam body portion 41 to the portion around the connection portion 4k, and a portion from the lower end portion 4c of the beam extension portion 42 to a portion around the connection portion 4k are each attached to the door body 21 in a cantilever state. Accordingly, the door beam 4 is formed so as to be capable of uniformly dispersing the crash induced load at three points, namely, the front end portion 4a and the rear end portion 4b of the beam body portion 41 and the lower end portion 4c of the beam extension portion 42.

As described above, in the vehicle door according to the embodiment of the present disclosure, since the first bead portion 4g and the second bead portion 4h are formed substantially in line symmetry about a portion around the connection portion 4k and the recessed longitudinal groove portion 4f and extend from the front end portion 4a and the rear end portion 4b to the lower end portion 4c so as to be curved at a substantially right angle, the deformation of the door beam 4 can be controlled so that the middle portion becomes bent; accordingly, the load transmissibility upon front collision can be improved.

Since the door beam 4 can be formed easily by press working a single piece of rolled steel plate, the structure and the manufacturing process thereof are simplified and, accordingly, increase in the number of parts, the weight, working man-hours, processing time, and cost can be suppressed.

[Modification]

Note that the present disclosure is not limited to the exemplary embodiment described above and various alternations and changes can be made within the scope of the technical idea of the present disclosure, and it goes without saying that the present disclosure covers the alternations and changes of the present disclosure. Note that components that have been described already are designated with the same reference numerals and descriptions thereof are omitted.

[Modification of Beam Extension Portion]

Figure 9A:
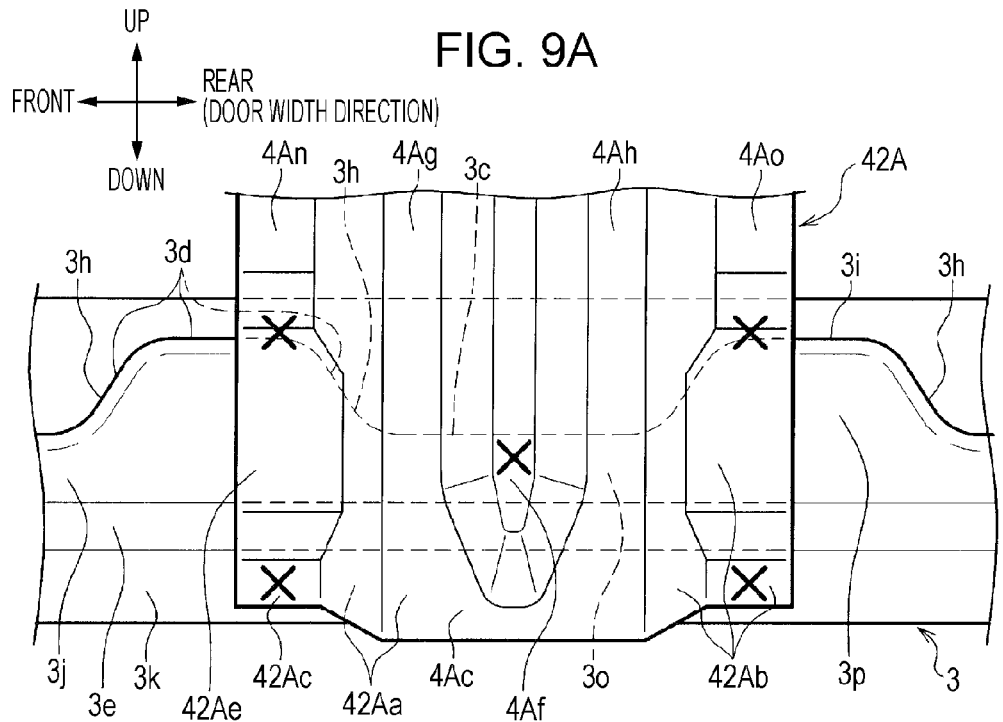
Figure 9B:
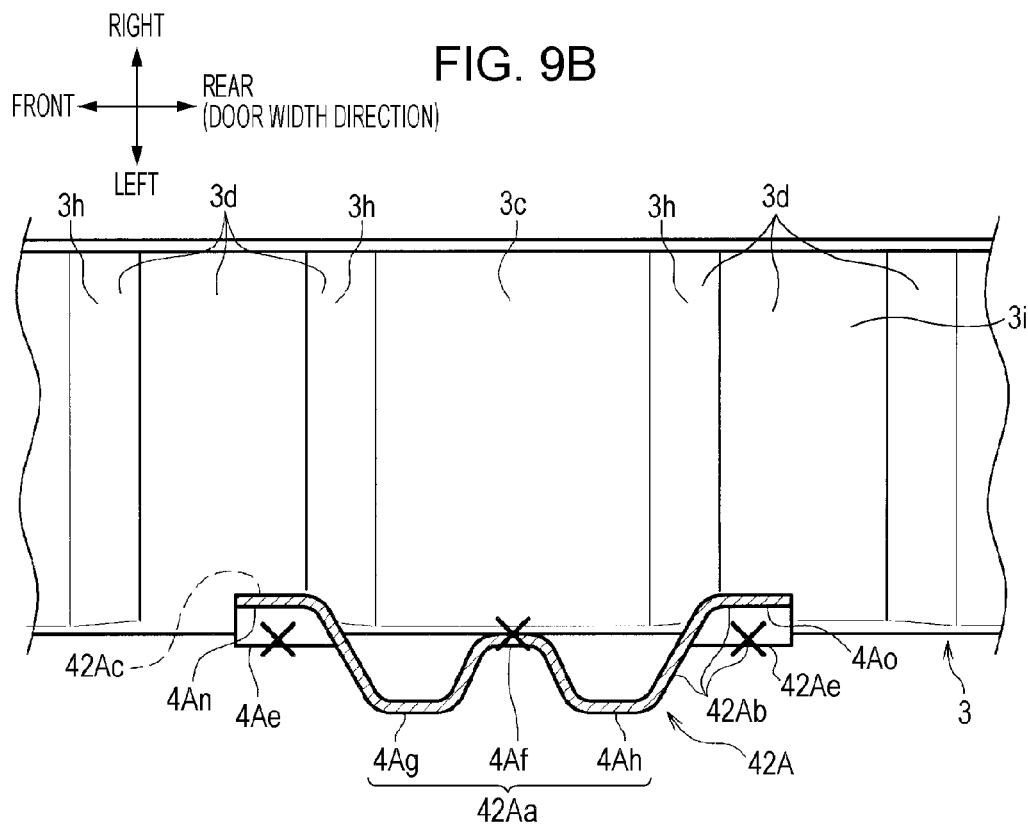
Figure 10A:
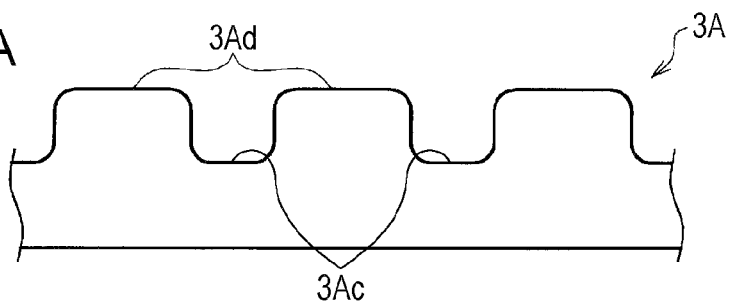
FIGS. 10A to 10E are each an enlarged schematic diagram illustrating an essential portion of a modification of a lower reinforcing member.
Figure 10B:
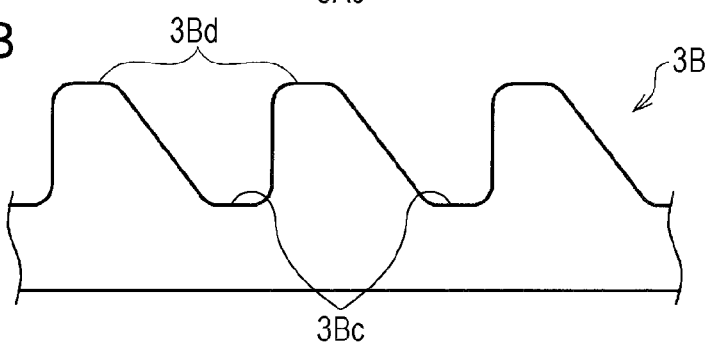
Figure 10C:
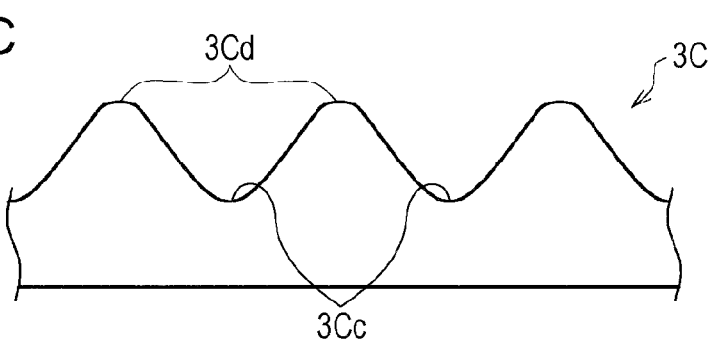
Figure 10D:
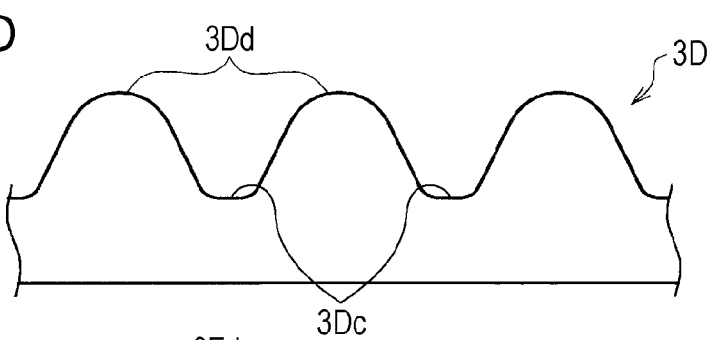
Figure 10E:
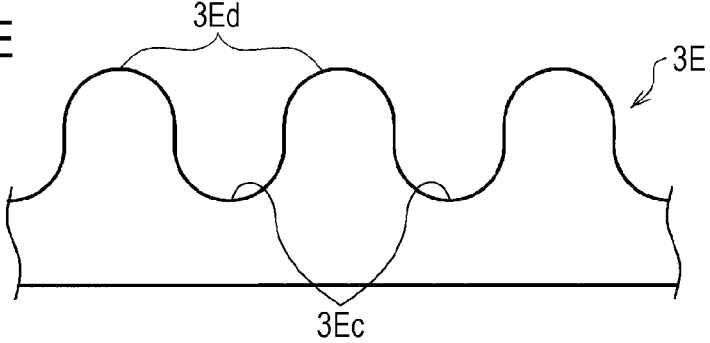

FIGS. 9A and 9B are diagrams illustrating a modification of the beam extension portion of the vehicle door according to the present disclosure, in which FIG. 9A is an enlarged perspective view illustrating an essential portion of the beam extension portion and FIG. 9B is an enlarged cross-sectional view illustrating the beam extension portion.

In the exemplary embodiment described above, the door beam 4 in which the inner extension portions 42b that are disposed so as to overlap the inclined surfaces 3h of the convex portions 3d when viewed in the front-rear direction and the lower extension portions 42c that are disposed so as to overlap the underside 3e and the concave portions 3c when viewed in the up-down direction are formed in the beam extension portion 42 has been illustrated in FIGS. 5 and 8 as an example of the door beam 4; however, the present disclosure is not limited to the example. In other words, it is only sufficient that the beam extension portion 42 is provided with a portion that is disposed so as to extend into the vehicle inner side and that overlaps, in the front-rear direction or in the up-down direction, the inclined surfaces 3*h* or the concave portions 3*c* that are depressed with respect to the convex portion top face 3*i* of the lower reinforcing member 3.

As illustrated in FIGS. 9A and 9B, a beam extension portion 42A may include an extension portion body 42Aa that is disposed so as to overlap the outer side surface 3*b* (the concave portion 3*c* and the concave portion-abutting side surface 3*o*) of the lower reinforcing member 3 from the vehicle outer side in side view, inner extension portions 42Ab that extend from the beam body portion 41 to a lower end portion 4Ac of the beam extension portion 42A and that are disposed so as to overlap the convex portions 3*d* when viewed in the front-rear direction, and a recessed longitudinal groove portion 4Af that is disposed so as to overlap the concave portion-abutting side surface 3*o* and the concave portion 3*c* in side view.

In the above case, the recessed longitudinal groove portion 4Af is formed in the middle portion of the extension portion body 42Aa in plan view and is formed between a first bead portion 4Ag and a second bead portion 4Ah. The lower end portion of the recessed longitudinal groove portion 4Af is, in side view, disposed so as to overlap the concave portion-abutting side surface 3*o* and is joined thereto, and, accordingly, is formed so as to be capable of receiving a side impact load. The inner extension portions 42Ab are disposed so as to partially overlap the convex portion top faces 3*i* and the inclined surfaces 3*h* (the convex portions 3*d*) in side view, and are disposed so as to extend into and overlap the convex portion top faces 3*i* and 3*i* and the inclined surfaces 3*h* and 3*h* in plan view.

Even if the beam extension portion 42A is formed in the above manner, because the inner extension portions 42Ab are disposed so as to overlap the convex portions 3*d* when viewed in the front-rear direction, upon collision, distortion of the beam extension portion 42A with respect to the lower reinforcing member 3 can be suppressed.

Furthermore, in lower end portion 4Ac of a lower front flange 4An and a lower rear flange 4Ao, engagement portions 42Ae may be formed that are disposed so as to, when viewed in the up-down direction and from the vehicle outer side, overlap and engage with portions that protrude in a U-shape when viewed in the front-rear direction and that are each formed by a portion of the convex portion top face 3*i*, the underside 3*e*, and the convex portion-abutting side surface 3*p* (the upper outer side surface 3*j*). Lower extension portions 42Ac that are joined to the lower outer side surface 3*k* are formed on the lower side of the engagement portions 42Ae.

With the above configuration, upon collision, distortion of the lower end portion 4Ac of the beam extension portion 42A with respect to the lower reinforcing member 3 can be suppressed in a further reliable manner.

[Modifications of Lower Reinforcing Member]

FIGS. 10A to 10E are each an enlarged schematic diagram each illustrating an essential portion of a modification of the lower reinforcing member.

Furthermore, the shapes of the convex portions 3*d* and the concave portions 3*c* of the lower reinforcing member 3 are not limited to particular shapes as long as the convex portions 3*d* are formed so as to protrude upwards with respect to the concave portions 3*c* and as long as a portion of the inner extension portion 42*b* or lower extension portion 42*c* is allowed to, when viewed in the front-rear direction, extend into a portion between the convex portion 3*d* and the convex portion 3*d*. Other than the lower reinforcing member 3 in which the convex portions 3*d* and the concave portions 3*c* have the trapezoidal thread shape in longitudinal sectional view, the lower reinforcing member 3 may be, for example, a lower reinforcing member 3A in which concave portions 3Ac and convex portions 3Ad have a square thread shape illustrated in FIG. 10A, a lower reinforcing member 3B in which concave portions 3Bc and convex portions 3Bd have a buttress thread shape illustrated in FIG. 10B, a lower reinforcing member 3C in which concave portions 3Cc and convex portions 3Cd have a triangular thread shape illustrated in FIG. 10C, a lower reinforcing member 3D in which concave portions 3Dc and convex portions 3Dd have a round thread shape illustrated in FIG. 10D, and a lower reinforcing member 3E in which concave portions 3Ec and convex portions 3Ed have a Edison screw thread shape illustrated in FIG. 10E.

[Other Modifications]

In the exemplary embodiment described above, the front door that is disposed on the left side of the front seat of the vehicle body 1 is cited as an example of the door 2; however, the door 2 may be any opening/closing body that is capable of installing the door beam 4 and the lower reinforcing member 3 therein. The door 2 may be a rear door that is installed in the vehicle body lateral portion 1*a* or a back door that is disposed in the rear portion of the vehicle body 1.

Furthermore, in the exemplary embodiment described above, as described in FIG. 1, the door beam 4 that includes the beam body portion 41 that extends in the front-rear direction from the front end portion 4*a* towards the rear end portion 4*b* while inclining downwards towards the rear, and the beam extension portion 42 that extends downwards from the beam body portion 41 has been cited as an example of the door beam 4; however, the door beam 4 is not limited to the cited example. For example, the beam body portion 41 may be one that is formed in a horizontal manner or that is formed so as to be inclined downwards towards the front.

Furthermore, the beam extension portion 42 may be one that is extended obliquely downwards in the front-rear direction from the beam body portion 41.

Furthermore, the beam extension portion 42 may be a beam extension portion in which the number of first bead portions 4*g*, second bead portions 4*h*, and recessed longitudinal groove portions 4*f* has been appropriately increased in accordance with the size of the door 2.

Furthermore, as long as the lower end portion 4*c* of the beam extension portion 42 is formed so as to overlap the lower reinforcing member 3, a plurality of beam extension portions 42 may be formed that extend downwards from a plurality of portions of the beam body portion 41.

What is claimed is:

1. A vehicle door, comprising:
   a door body for opening and closing a door opening of a vehicle body, the door body having a door width direction which extends along the vehicle body when the door body closes the door opening;
   a lower reinforcing member that is provided to a lower inside of the door body and extends in the door width direction; and
   a door beam including:
      a beam body portion that is provided to an inside of the door body and extends in the door width direction at a position above the lower reinforcing member to support the door body in the door width direction; and
      a beam extension portion that extends downwards from the beam body portion to the lower reinforcing member to support the beam body portion, wherein
   the lower reinforcing member includes an upper surface that extends in the door width direction and a side surface that extends downwards from the upper surface and faces toward a vehicle outer side, the upper surface of the lower reinforcing member includes a concave portion and a convex portion that protrudes upwards from the concave portion in the door width direction, and the beam extension portion includes, an extension portion body that is disposed to the side surface of the lower reinforcing member so as to in part overlap the reinforcing member in a view from the vehicle outer side in a vehicle inside-outside direction, and an engagement portion that extends inwards from the extension portion body towards a vehicle inner side and engages with the concave portion of the lower reinforcing member such that the engagement portion at least in part overlaps the convex portion in the door width direction.

2. The vehicle door according to claim 1, wherein the extension portion body of the beam extension portion is disposed so as to overlap the convex portion of the lower reinforcing member in the view from the vehicle outer side.

3. The vehicle door according to claim 1, wherein the lower reinforcing member has the convex portion at both sides of the concave portion in the door width direction, the beam extension portion has the engagement portion at both sides of the extension portion body in the door width direction such that each engagement portion engages with each concave portion at each side of the convex portion.

4. The vehicle door according to claim 1, wherein the lower reinforcing member has a plurality of the convex portions that are arranged in the door width direction, and the beam extension portion has the engagement portion that is disposed between the adjoining convex portions.

5. The vehicle door according to claim 1, wherein the side surface of the lower reinforcing member includes an underside portion that extends downwards and inwards towards the vehicle inner side, and the beam extension portion includes a lower extension portion that extends to overlap the underside portion in a view from an up-down direction of the door body so as to engages with the underside portion of the lower reinforcing member.

6. The vehicle door according to claim 1, wherein the extension portion body includes a bead portion that continuously extends along a longitudinal direction of the beam body portion, and the bead portion is disposed to the lower reinforcing member so as to in part overlap an outer side of the convex portion in a view of the vehicle inside-outside direction.

7. The vehicle door according to claim 6, wherein the bead portion further extends downwards and beyond the underside portion of the side surface of the lower reinforcing member, the beam extension portion includes a lower extension portion that extends to overlap the underside portion in a view from an up-down direction of the door body so as to engages with the underside portion of the lower reinforcing member, and the lower extension portion overlaps the concave portion of the lower reinforcing member in the view of the vehicle inside-outside direction.

8. The vehicle door according to claim 1, wherein the engagement portion of the beam extension portion is welded to the concave portion in an up-down direction of the door body.

9. The vehicle door according to claim 5, wherein the side surface of the lower reinforcing member includes a concave portion-abutting side surface which extends between the concave portion and the underside portion, and the beam extension portion includes a concave-abutting side engagement portion that engages with the concave portion, the concave portion-abutting side surface and the underside portion.

* * * * *